United States Patent [19]

Tardy

[11] 4,220,394
[45] Sep. 2, 1980

[54] OPTICAL FIBRE CONNECTOR

[75] Inventor: André Tardy, St. Germain les Arpajon, France

[73] Assignee: Société Anonyme dite: Compagnie Generale d'Electricite, Paris, France

[21] Appl. No.: 916,385

[22] Filed: Jun. 16, 1978

[30] Foreign Application Priority Data

Jun. 22, 1977 [FR] France .................. 77 19084

[51] Int. Cl.² ............................................. G02B 5/14
[52] U.S. Cl. .................................. 350/96.21; 65/4 B
[58] Field of Search ............... 350/96.20, 96.21, 96.22; 65/4 B, 40, 42, 152

[56] References Cited

U.S. PATENT DOCUMENTS

| 3,579,316 | 5/1971 | Dyott et al. ............. 350/96.21 |
| 3,928,102 | 12/1975 | Rowe et al. ............. 350/96.21 |
| 3,960,531 | 6/1976 | Kohanzadeh et al. ....... 350/96.21 |
| 4,049,414 | 9/1977 | Smith .................... 350/96.21 |

FOREIGN PATENT DOCUMENTS 2516858 10/1976 Fed. Rep. of Germany ........ 350/96.21

OTHER PUBLICATIONS

Kohanzadeh "Hot Splices of Optical Waveguide Fibers", *Applied Optics*, vol. 15, No. 3, Mar. 1976, pp. 793–795.

*Primary Examiner*—Stewart J. Levy
*Attorney, Agent, or Firm*—Suhhrue, Rothwell, Mion, Zinn and Macpeak

[57] ABSTRACT

The invention relates to an optical fibre connector.

A short segment of fibre with a diameter which is accurately known and which is held in the connector is connected by welding to the end of a very long transmission fibre.

Application to telecommunications.

10 Claims, 10 Drawing Figures

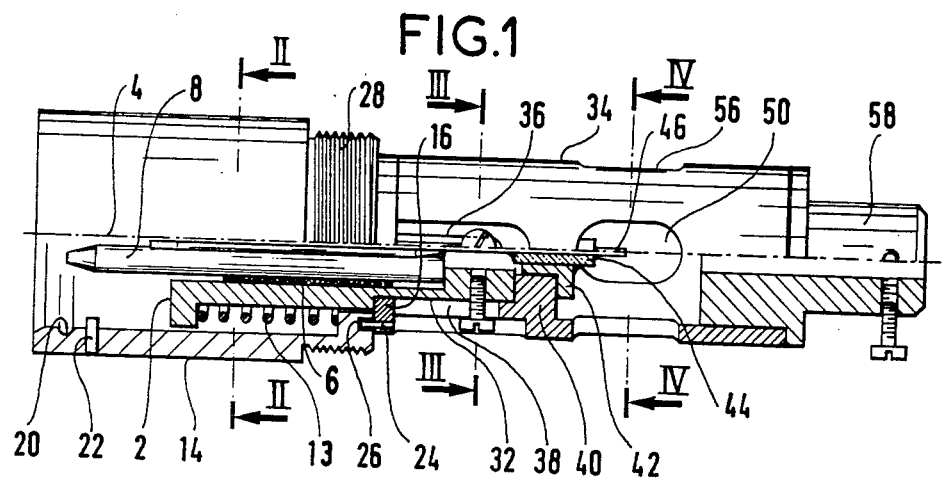
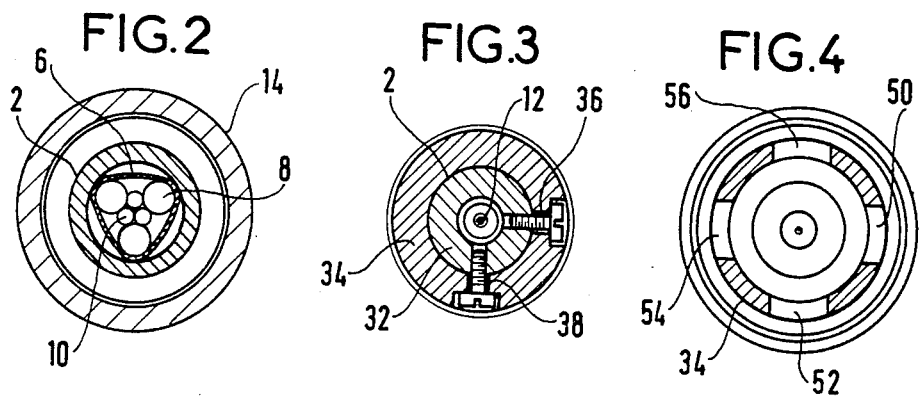
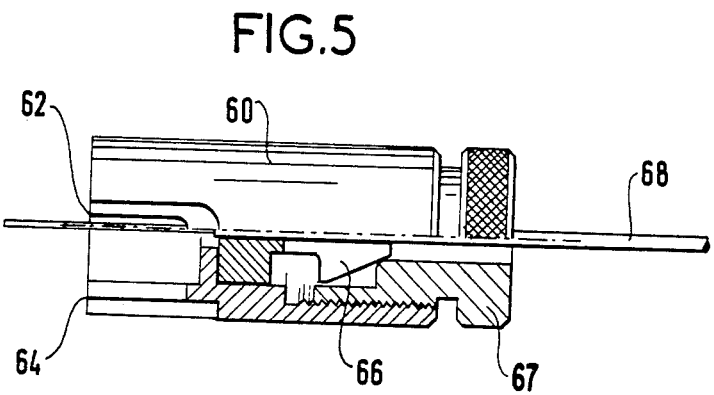

OPTICAL FIBRE CONNECTOR

FIELD OF THE INVENTION

The invention relates to an optical fibre connector.

BACKGROUND OF THE INVENTION

Such a fibre includes, for example, a glass core with a diameter of 100 microns surrounded by an optical cladding made of the same material, for example plastics material, and having a lower refractive index.

The connector usually includes "holding means" to allow accurate manipulation of one end of one of the optical fibres to be connected, which end is stripped of its outer covering. Other means are used for guiding the holding means so as to allow the held end to be placed in a precise position which provides the required optical connection, for example connection to another optical fibre held in a complementary type of connector (a male connector being complementary to a female connector). These holding means taken as a whole and possibly together with guide means constitute the connection part of the connector whose other parts will be described hereinafter.

The nearer the diameter of the fibre to that for which the holding means are provided, the greater the accuracy of the position of the fibre. These means can be constituted for example by three steel rods which have the same diameter, and which are pressed tightly together with their axes passing through the three apexes of an equilateral triangle situated in a plane perpendicular to these axes. These three rods delimit between them a holding passage for a glass fibre of a certain diameter which can be referred to as the "design diameter". If a fibre has a diameter greater than the design diameter, it cannot be inserted in the holding passage. If a fibre has a diameter smaller than the design diameter, it can move transversally in the holding passage and good optical connection is practically impossible. If other types of holding means are used, it remains evident that they will make it possible to obtain a better optical connection nearer the diameter of the glass fibre is to the "design diameter".

Now, in industrial production of optical fibres, variations of about 4% on either side of a required "rated" diameter are generally observed. It can be hoped that these variations will be reduced for example to 2% in the future, but not that they will be reduced to zero. It is therefore evidently apparent that it is necessary to improve optical connectors so as to allow good optical connections to be obtained despite uncertainties relating to the exact diameter of the fibres to be connected.

A connector usually further includes means for gripping the outer covering of the fibre to be connected. These means allow the end of this covering to be fixed in relation to the connector so that if the fibre is pulled from outside the connector, the force will be transmitted by the covering to the gripping means and will thus be transmitted to the connector as a whole via these means and not via the segment of glass fibre held in the connection part. Indeed, this segment would be in danger of being moved or broken if it were to transmit the force exerted on the fibre.

SUMMARY OF THE INVENTION

The present invention aims to produce an optical fibre connector which allows good optical connections to be obtained despite the lack of precision with which the diameter of the fibre to be connected can be known beforehand.

It provides an optical fibre connector which includes:

a connecting part provided with holding means suitable for holding an optical fibre of a pre-determined diameter and suitable for being guided to align the held fibre with another optical fibre held by a connecting part of another connector, and to bring the ends of these two fibres into contact with each other to provide an optical connection between the two fibres; and a gripping part which is integral with the connecting part and comprises gripping means behind the holding means for fixing an optical "transmission" fibre in alignment with the holding means so as to avoid any stress on the transmission fibre in front of the gripping means when a force is exerted on the transmission fibre behind the gripping means.

It is characterized by the fact that it also includes a segment of optical fibre held in the connection part, the length of this segment being less than five centimeters and its front end being covered with a anti-reflection coating, and an intermediate part which makes the connecting part integral with the gripping part, this intermediate part having at least one opening which allows access to a zone of contact between the rear end of said held segment and the end of said transmission fibre, this opening being sufficiently wide to allow welding through it to provide optical continuity between the rear end of the held segment and the end of the transmission fibre.

It also provides a method of connecting an optical "transmission" fibre to a connector comprising the following steps:

firstly a segment of optical fibre shorter than five centimeters, with a diameter to which the connecting part is fitted, is inserted in the connecting part of the connector and the segment is held in this part, the segment having a front end by which it can be connected and a free rear end;

the end zone of the optical "transmission" fibre which is to be connected to the connector is inserted in a gripping part of the connector; the end of the transmission fibre is aligned with the rear end of the held segment and is brought close thereto;

these two ends are heated so as to form a weld which provides optical continuity between the transmission fibre and the held segment; and the transmission fibre is fixed in relation to the connecting part by means of the gripping part and of an intermediate part which makes the blocking part integral with the connecting part.

It further provides a method of forming a detachable optical connection between two optical "transmission" fibres by means of two complementary connectors which co-operate together and each of which comprises:

a connection part provided with holding means suitable for holding a segment of optical fibre of a predetermined diameter and suitable for being guided to align the held segment and put its end in contact with the end of another segment of optical fibre held by the connection part of the complementary connector so as to connect these two held segments optically together, this method being characterized by the fact that it comprises the following steps:

an optical fibre segment is disposed in each connection part so that the segment is held by said holding means, the held segment being shorter than five centimeters and having its front end provided with an anti-reflection coating; and the rear ends of each of the two held segments are welded to the ends of the corresponding transmission fibres.

It should be observed that it was already known conventionally to produce an optical connection between two fibres by welding the ends of these fibres. But the connection thus produced is evidently not detachable. Such a connection generally causes a loss of light energy of about 6%.

A connection produced between two optical fibres by means of two complementary connectors in accordance with the invention has the obvious disadvantage that three causes of loss of light energy are added together, namely, a weld in the male connector, the crossing of an air gap between the facing ends of the two segments held in the connection parts and a second weld in the female connector. Taking into account the fact that, for the man in the art, the aim to be achieved when producing the connection is to reduce the overall loss of light energy, this addition of three causes of loss could seem to prevent absolutely this aim from being achieved. This situation is evidently very different from that of the electric connectors which sometimes have welds between male or female connection pins and the ends of the metal wires to be connected. Indeed, in these electric connectors, there are no problems which are comparable to those in optical connectors, neither with respect to the alignment of the parts, nor with respect to welds. Welds can be produced which have an electrical resistance which is as low as necessary.

To realize the advantages of the present invention, it is necessary to study the conditions in which the light signal loses energy at various points of its path according to whether the optical connection between two optical fibres is formed by means of two complementary connectors of known type or by means of two complementary connectors in accordance with the invention. This will be examined approximately hereinbelow in the case where the fibres to be connected are of a current type, i.e. have average coupling between the various modes of propagation of light and average uncertainty on the diameter of the glass fibre. It takes into account the following three facts which make it possible to understand the effectiveness of the invention in achieving the required aim.

The segment of fibre held in the connection part is not very long. Firstly, its diameter can therefore be chosen to the required accuracy without any extra cost resulting therefrom. Secondly, this short segment can be inserted in the connection part in a factory itself in which the connector is manufactured. The result of this is that its front end which is to be in contact with the inevitable air gap between fibres to be connected can easily be provided with a coating of the anti-reflection type which reduces the losses by reflection at the glass-air interface. While in contrast, it is practically impossible to deposit such a coating on the end of a very long transmission fibre cut on a work site where a transmission system is being produced. Thirdly, it is known that a weld between two fibres does not cause loss of light energy for all modes of light propagation in the fibre, but only for those modes which correspond to light rays propagating at relatively wide angles to the separation surface between the core of the fibre and its cladding of lower refractive index. During the subsequent propagation of light in the fibre, beyond the weld these modes progressively recover energy at the expense of the other modes due to coupling between all the modes which propagate in a fibre. The poorer the quality of the fibre, the more intense the coupling. The result of this is that if one weld follows another at a very short distance in line, the modes which lose their energy on passing through the first weld do not have time to gain much energy from the other modes before reaching the second weld. Passing through this second weld will therefore cause only a small extra loss of energy. In contrast, if two welds are far apart, the balance between the modes will be completely re-established when light reaches the second weld and this second weld will cause the light to lose the same proportion of its energy as did the first. For a fibre of current quality, a single weld causes, for example a loss of energy of 6%. Two welds 10 cm apart then cause a total of about 8%, whereas if they are 40 cm apart, the total loss reaches almost 12%. The importance of this third fact becomes apparent when it is known that it is easy to impart to the held segment a length of less than 5 cm and that the distance between two welds necessary for producing a connection in accordance with the invention between two transmission fibres is equal to the sum of the lengths of the two held segments in the two complementary connectors which co-operate together to form this connection.

The loss of a connection in accordance with the invention will then be 8% for the two welds and 1% for the two air-glass interfaces at the front ends of the two held segments using an anti-reflection coating. The total loss then comes to 9%.

A connection made according to the prior art would cause, in the same conditions, a loss of about 8% for the two air-glass interfaces, without anti-reflection coatings and a loss which can vary between 1% and 15% because of the almost inevitable poor alignment of the two fibres and of the random difference of their diameters. The total loss would therefore vary in a random manner between 9% and almost 25%.

An embodiment of the invention is described hereinbelow by way of example with reference to the accompanying drawings.

BRIEF DESCRIPTION OF THE DRAWINGS

FIG. 1 is a half cross section view along an axial plane of the intermediate assembly of a connector in accordance with the invention;

FIGS. 2, 3 and 4 are views of the assembly shown in FIG. 1 in cross-sections along planes perpendicular to its axis, respectively II—II, III—III and IV—IV;

FIG. 5 is a half cross-section view along an axial plane of the gripping part of the connector;

DESCRIPTION OF PREFERRED EMBODIMENTS

Figure 6:
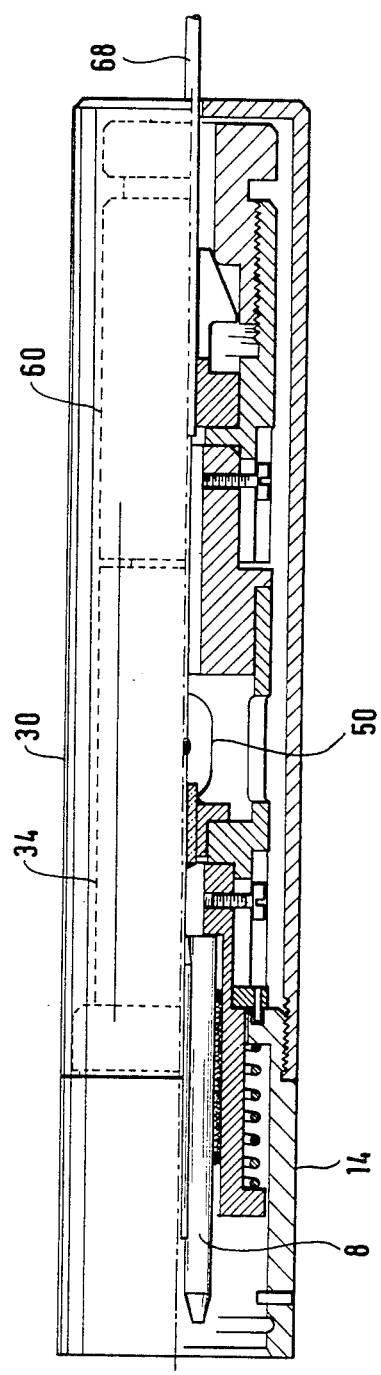
FIG. 6 is a view of the connector in half cross-section through an axial plane.

Corresponding parts in several of these figures are designated therein by the same reference symbols.

The female type connector which will be described is constituted by a set of components disposed coaxially round and along a common axis 4. The fibres and segments of fibres which are to be connected succeed one another along this axis so as to form an optical connector which allows the transmission of a signal. The fibre diameter is too small, for example 100 microns, for it to be shown at its exact scale in the figures. The components of the connector can be made for example of brass, except some of them which must obviously be made of a different material which will sometimes be indicated.

This connector includes a connection part 2 (see FIG. 1) which is generally shaped like a thick cylindrical tube. Inside this tube, fixed for example by gluing, there is an assembly constituted by a clamping tube 6 made of thin spring steel which, by resilient deformation, tightly surrounds three guide rods 8 of 1.5 mm diameter, for example, between which are clamped three holding rods 10 of 0.82 mm diameter for example, which delimit between them an axial holding passage in which a segment of optical fibre 12 is held.

All these rods are parallel to the axis 4. They are made of hard steel and are machined with precision so as to impart thereto an exactly cylindrical shape and a well-determined diameter. They are coextensive along the axis 4 except that the guide rods 8 protrude towards the front of the connector, i.e. towards the left in FIGS. 1 to 6, in relation to the holding rods. Each holding rod is in lateral contact with the other two. Each guide rod is in contact with two holding rods, except along its protruding part. The front end of the held fibre segment is in the same plane perpendicular to the axis as the front ends of the three holding rods.

Before its insertion between the holding rods 10, this front end is coated with a double anti-reflection layer constituted for example by a layer of titanium oxide $TiO_2$ and a layer of magnesium fluoride $M_9F_2$.

Figure 9:
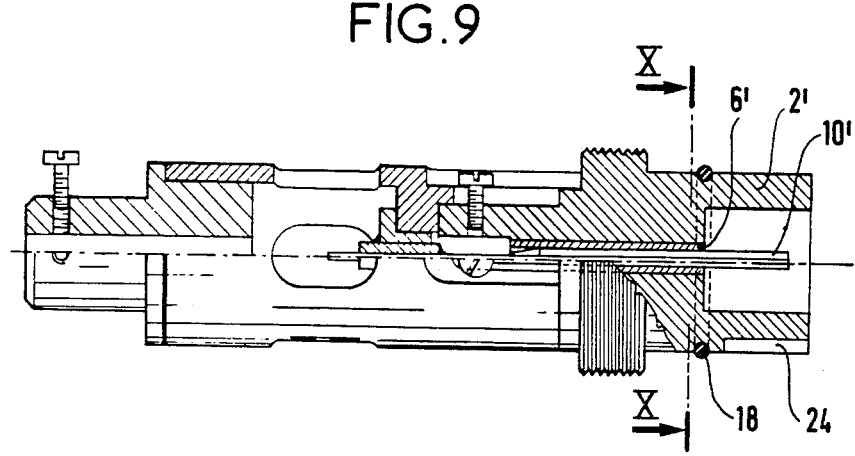
FIGS. 9 and 10 are respectively a half axial cross-section and a transverse cross-section analogous to FIGS. 1 and 2 and differ therefrom only by the fact that they show parts of connectors complementary to those of FIGS. 1 and 2.
Figure 10:
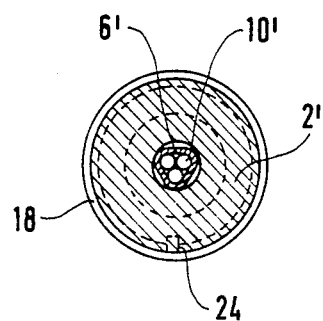

The protruding parts of the three guide rods form together a guide passage in which a set of three other holding rods 10' can be inserted which form a part of a connector of the male type (see FIGS. 9 and 10).

Such a connector is analogous to the female connector described, except that it does not have any guide rods, the clamping tube 6' which is analogous to the tube 6 then having a smaller diameter so as to clamp the holding rods directly, the connecting part 2' analogous to the part 2 then having an inside diameter which is decreased accordingly.

Such a disposition makes it possible to align very accurately the fibre segments disposed in the two holding passages formed by the two sets of three holding rods. For this purpose, it requires, however, that the diameters of the holding rods will be equal to that of the fibre multiplied by 6.46 so that each of these rods will be in contact with the fibre. This requirement can be satisfied if the diameter of the fibre is known when the holding rods are machined. This is easy to know when the fibre segment held between the two holding rods is very short, about 2.5 cm for example. It would be practically impossible with a very long fibre.

The connecting part 2 is provided at its front end with an external shoulder which allows to press against it the front end of a compressed spiral spring 13 (FIG. 1) whose rear end presses against an internal shoulder of a front hood 14 which surrounds the connecting part 4 with radial play and which is pushed back by this spring against a stop 16 fixed on the connecting part 2. This disposition allows this hood to move resiliently in relation to the part 2, firstly several millimeters forward and secondly radially and in rotation.

Its purpose becomes apparent when the male connector (FIG. 9) is detachably connected to the female connector (FIG. 1) by engaging the front hood 14 of the female connector round the connecting part 2' of the male connector and snapping the hood onto the connecting part by means of a ring 18 constituted by an elastomer carried by the connecting part 2' and co-operating with an internal groove 20 of the hood 14. The holding rods 10' of the male connector then engage in the guide passage constituted by the guide rods 8 and abut against the front end of the holding rods 8. They are then held resiliently against this end by means of the connecting part 2', of the front hood 14, of the compressed spring 12 and of the connecting part 2.

Thus, contact is provided between the front ends of the two optical fibre segments held in the two connecting parts. Further, these segments are aligned by the precision machined guide rods 8 and not by the front hood 14 because of the radial clearance of the latter in relation to the connecting part 2. The holding rods 2' are angularly pre-positioned approximately in relation to the guide rods 8 by means of a radial lug 22 on the inside of the hood 14 and co-operating with a longitudinal groove 24 cut externally in the connecting part 2' and by means of a longitudinal lug 24 on the stop 16 and which co-operates with a hollow part 26 on the connecting part 2.

The front hood 14 of the female connector and the connecting part 2' of the male connector each has a thread 28 which allows a rear hood such as 30 (FIG. 6) to be screwed on which surrounds the parts of the connector situated at the back of the connecting parts and leaving some radial clearance. Each connecting part also has a rear extension such as 32 (FIGS. 1 and 3) which allows an intermediate part such as 34 to be fixed. Each of the parts of the male connector, which will now be described corresponds to an identical part of the female connector.

The intermediate part 34 has the shape of a tube pierced at its front end with two parallel longitudinal grooves 36 and 38 shifted angularly by 90° about the common axis. Each of these grooves allows a screw to pass which fixes this part on the rear extension 32, with a possibility of longitudinal adjustment.

A little way back, the intermediate part 34 includes an interior thickening 40 which allows a socket 42 to be fitted. The socket 42 has an axial bore in which a ceramic carrier 42 for the fibre 44 is fitted. The held segment of fibre 44 is fixed by its rear part in this fibre-carrier, the rear end of this segment protruding towards the rear.

The dispositions which have just been described make it possible to ensure that the front end of the held segment is in the plane of the front ends of the holding rods 10, by longitudinally sliding the screws in the grooves 36 and 38.

In a first phase, the rear end of the held segment is free. Facing this rear end, the wall of the intermediate part 34 is pierced by four openings 50, 52, 54 and 56 at 90° to each other and intended to make it possible to weld this end. These openings are, for example, 7 mm long in a direction parallel to the axis 4 and each extend over an arc of 30° round the axis 4, the intermediate part having a diameter of 10 mm. They make access possible to an axial "contact zone" in which there is the rear end 5 of the held segment.

The intermediate element ends by a rear extension 58 which is intended to allow a gripping part to be fixed and which is hollowed out on the axis to allow an optical transmission fibre to pass.

The gripping element 60 (FIG. 5) has a generally tubular shape. Its front end is pierced with two parallel longitudinal grooves 62 and 64 which are at 90° to each other about the common axis and each allow a screw to pass through for adjustably fixing this part on the rear extension 58 of the intermediate part. It has inside it a clamp with four symmetrical jaws such as 66 which delimit an axial passage and which can move radially towards the axis under the action of a nut 67 which moves longitudinally and co-operates with the conical exterior surfaces of the four jaws. Thus, an optical "transmission" fibre 68 provided with an external polyamide covering can be clamped on the axis.

The front end of this fibre 68 is stripped of its covering and protrudes towards the front beyond the gripping part 60 so as to be able to reach the rear end of the held segment 46 when this gripping part is fixed on the extension 58. This is shown in FIG. 6 where these two ends are welded together and where the openings such as 50 are masked by the rear hood 30. The radial clearance between this hood and the intermediate part 34 and the gripping part 60 makes it possible, at the time of the connection with a male connector, to ensure that the positions of the connecting part 2, of the intermediate part 34 and of the gripping part 60 are determined by means of guide rods 8 and not by means of the front hood 14.

Although it is not shown, it can actually be an advantage to surround the transmission fibre 68 with a second stronger external covering round the first covering and to grip this second external covering in a second gripping part situated behind the part 60 with a slack fibre between these two gripping parts. This makes it possible to avoid tensile stresses on the first external covering.

Figure 7:
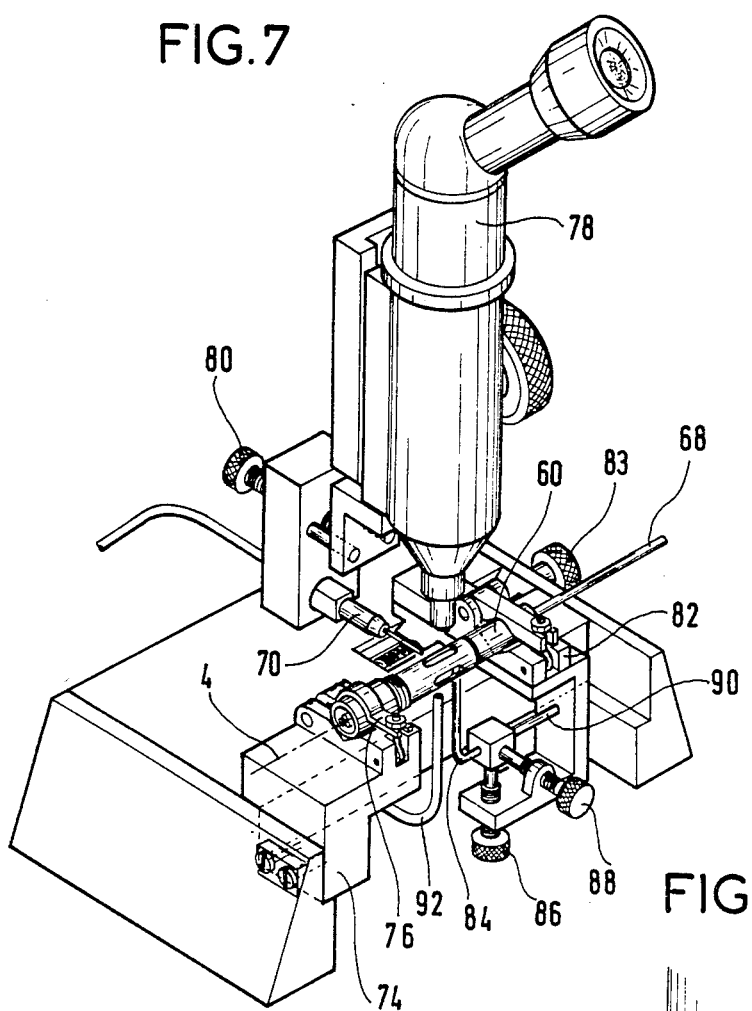
FIG. 7 is a perspective view of an arrangement using the methods in accordance with the invention.
Figure 8:
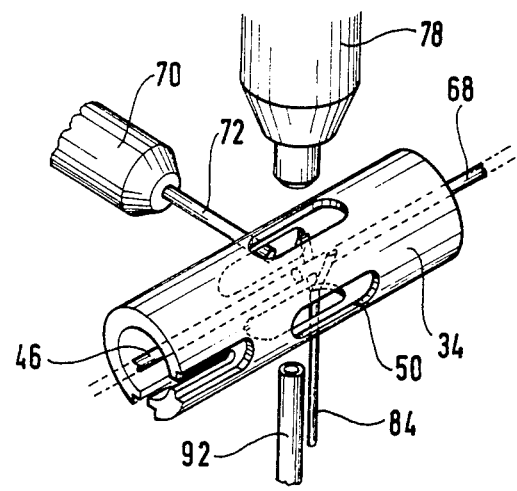
FIG. 8 is an enlarged perspective view which shows a detail of FIG. 7.

The two ends of the fibres are welded with an oxyhydrogen micro-blowpipe 70. The diameter of the injector 72 (hollow metal needle) is 0.1 mm (or 0.2 mm). The temperature of the flame makes it possible to obtain the softening temperature of silica (about 1700°). The small size of the flame (length 0.5 mm, diameter 0.2 mm) allows welding in a small space. This characteristic is necessary to be able to weld the fibres inside the connector. Indeed, the welding operation makes the fibres fragile near the joint. This prevents any handling of the welded fibre. This is why the transmission fibre 68 is made integral with the blocking part 60 before the welding operation. In relation to other methods—arc between two electrodes, or focussing light from a lamp on the focus of an elliptical mirror—the shape of the injector facilitates the welding operation inside the connector. An example of a welding tool is shown in the perspective views of the various devices of which it is made (FIGS. 7 and 8).

The connection part is positioned on a fixed support 74 which has a V-shaped alignment groove. A clamp 76 fixes the part.

By observation by means of an optical sight 78 which magnifies about 150 times, the operator makes the axis and the rear end of the held segment of fibre coincide, by hand, with two orthogonal lines of the cross hairs of the optical sight.

This sight is so constructed that the two lines of the cross-hairs correspond to the input axis of the injector and to the theoretical operating axis of the micro-blowpipe which can be moved by means of a screw 80 along its horizontal axis which is perpendicular to the axis 4.

The operating position of the micro-blowpipe is adjusted by means of a stop. The operating distance between the end of the injector and the axis of the fibre is 0.8 mm.

Due to the fact that the moveable equipment of the injector is integral in the vertical direction with the adjusting plate of the sight, adjustment automatically brings the axis of the injector into the horizontal plane of the fibre. The operator positions the gripping part 60 on a support 82 which can move parallel to the axis 4 by means of a screw 83 after having previously inserted and gripped the transmission fibre in this part.

A manipulation rod 84 integral with the moveable support 82 makes it possible to set the position of the end of the fibre in two axes orthogonal to each other and to the axis 4. It is controlled by two screws 86 and 88 which co-operate with a resilient rod 90 and ends in a V-shaped part which makes it possible to trap the fibre 68. By observation through the sight, the manipulation rod allows two fibres to be made coaxial, translation of the support 82 allowing a pressure to be exerted between the fibres.

Observation is facilitated by lighting up the contact zone simultaneously in the direction of the sight 78 and in the direction (not shown) perpendicular to the sight by means of two lighting optical fibres such as 92.

The operator observes two light rays, one related to the refraction of the light by the fibre, the other, less intense and thinner related to the reflection of the light coming from the direction perpendicular to the sight. The alignment of the rays in relation to the two fibres causes the alignment of the fibres in both axes. The alignment of the rays completes a first alignment which results from the clear observation of the two fibres and from the direct observation of the shift in the plane perpendicular to the sight.

The operator then only has to bring the injector to a suitable distance from the fibres by pushing the movable equipment until it comes against the built-in pre-set stop.

The operator watches the welding operation which lasts about 5 seconds through the sight 78.

All the welding operations are carried out through the four openings 50, 52, 54 and 56.

After welding, before the connector is removed from its support, the operator fixes the gripping part to the intermediate part 34 of the connector by means of the two screws disposed in the grooves 60 and 62.

I claim:
1. An optical fibre connector including:
    a connecting part provided with holding means for holding a short optical segment fibre of a predetermined diameter and having a front end and a rear end and for guiding to align the held segment fibre with another optical segment fibre held by another optical fibre connector, and to bring the front ends of these two segment fibres into contact with each other to provide an optical connection between these two segment fibres; and a gripping part integral with said connecting part and comprising gripping means behind the holding means relative to said segment fibre front end for fixing a front end portion of a long optical transmission fibre of non-precisely predetermined diameter and of longer length than said segment fibre behind and in alignment with said segment fibre so as to avoid any stress on the transmission fibre in front of the gripping means when a force is exerted on the transmission fibre behind the gripping means;

and an intermediate part between said connecting and gripping parts for making the connecting part integral with the gripping part, said intermediate part having at least one opening which allows access to a zone of contact between the rear end of said held segment fibre and the front end of said transmission fibre, and said opening being sufficiently wide to allow welding through it to provide optical continuity between the rear end of the held segment fibre and the front end of the transmission fibre.

2. A connector according to claim 1, further comprising blockable sliding means to allow firstly a movement of the gripping part in relation to the connecting part, parallel to said held segment and to allow these two parts to be subsequently made completely integral with each other.

3. A connector according to claim 1, wherein said elements comprise a generally coaxial structure around an axis parallel to said held segment, and wherein said intermediate part is in the shape of a tube which surrounds said axis and has a plurality of said openings angularly spaced around said contact zone, and said connector also including a protective cover which is slidable parallel to said axis so as to surround the intermediate part while closing off the openings.

4. A method of connecting an optical transmission fibre to a connector in order to subsequently allow a releasable connection of said optical transmission fibre through the connector, said method comprising the following steps:
  firstly, inserting a segment of an optical fibre shorter than five centimeters in a connecting front part of the connector and holding said segment in this part, with said segment having a front end by which it can be connected and an opposite rear end and having a diameter to which the connecting part is fitted;
  inserting the end of an optical transmission fibre which is to be connected to the connector in a rear gripping part of the connector relative to said segment; and
  aligning the end of the transmission fibre with the rear end of said segment of optical fibre and being brought close thereto;
  heating the rear end of the segment and the end of the transmission fibre to form a weld which provides optical continuity between the transmission fibre and said held segment; and
  fixing the transmission fibre in relation to the connecting part by means of the gripping part and by means of an intermediate part which integrally joins the gripping part with the connecting part.

5. A method according to claim 4, further comprising the step of before inserting said fibre segment, in the connecting part treating its front surface for facilitating the transmission of light through this surface.

6. A method according to claim 4, wherein the step during which the "transmission" fibre and the rear end of the held segment are aligned and are brought close to each other, comprises:
  connecting the gripping part to the connection part by means of said intermediate part so as to align the end zone of the transmission fibre with the held segment so as to allow the gripping part to move in relation to the connection part in a movement parallel to the held segment, this intermediate part being provided with at least one opening to allow access to the rear end of the held segment;
  fixing the end zone of the transmission fibre in the gripping part and
  moving the gripping part in relation to the connecting part to bring the end of the transmission fibre close to the rear end of the held segment.

7. A method according to claim 6 wherein said intermediate part is in the shape of a tube which surrounds the rear end zone of the held segment and the end zone of the transmission fibre, said tube being provided with an inspection opening, a blow-pipe insertion opening, a manipulation opening and a gas evacuation opening facing the blowpipe insertion opening;
  said step of aligning the end of the transmission fibre with and bringing close to the rear end of the held segment comprising, after the phase in which the gripping part is moved, an extra alignment step in which a manipulation rod is inserted through said manipulation opening until it comes into contact with the end zone of the transmission fibre or with the held segment and this manipulation rod is moved in two directions perpendicular to the held segment and
  said heating phase is carried out by inserting a blowpipe through the gas blowpipe insertion opening and by heating by means of said blowpipe.

8. A method according to claim 6, wherein said extra alignment step consists of lighting said end zones with at least one non-diffused light beam, so as to make at least one line of reflected and/or refracted light appear on the walls of said end zones by means of the light which passes through the material of each of these two end zones.

9. A method according to claim 8, wherein said lighting is obtained by transmitting light through at least one lighting optical fibre.

10. A method of forming a detachable optical connection between two optical transmission fibres by means of two complementary connectors which interengage with each other, each of said complementary connectors comprising: a connecting part provided with holding means for holding a segment of an optical fibre of a predetermined diameter and for guiding said fibre segment to align the held segment and place the front end thereof in contact with the front end of another segment of optical fibre held by the connecting part of the complementary connector so as to connect these two held segments optically together through their abutting front ends, said method comprising the following steps:
  disposing an optical fibre segment of precisely said predetermined diameter in each connecting part so that the segment is held by said holding means, with each of said held segments being no greater than five centimeters in length and having its front end provided with an antireflection coating; and
  welding the rear end of each of the two held segments to an abutting end of a respective one of the two transmission fibres.

* * * * *